No. 731,531. PATENTED JUNE 23, 1903.
C. H. ASLING.
COMBINED WATER HEATER, FOOD WARMER, AND DRYING RACK.
APPLICATION FILED JUNE 25, 1902.
NO MODEL. 2 SHEETS—SHEET 1.
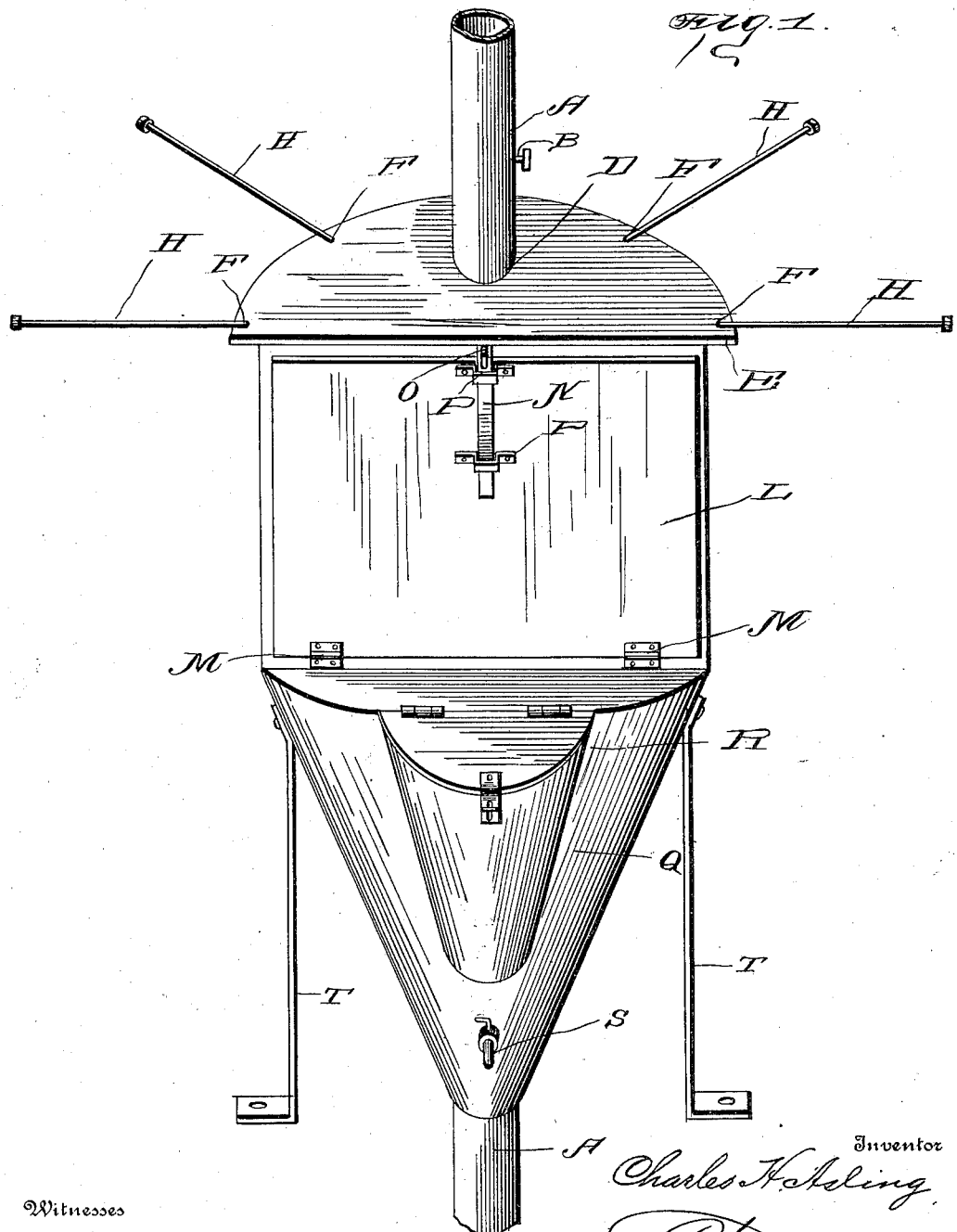

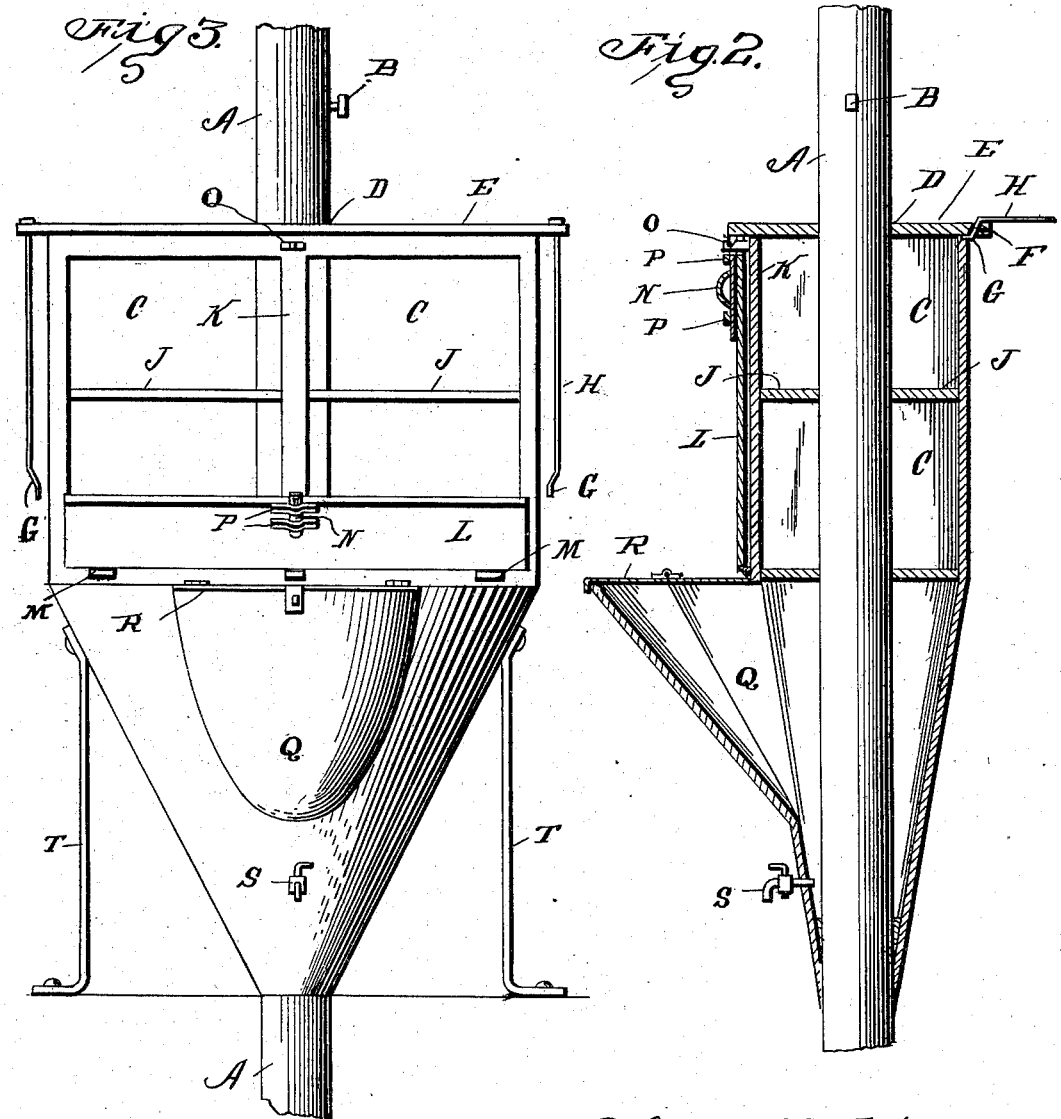

No. 731,531. Patented June 23, 1903.

UNITED STATES PATENT OFFICE.

CHARLES H. ASLING, OF SPRINGFIELD, MISSOURI.

COMBINED WATER-HEATER, FOOD-WARMER, AND DRYING-RACK.

SPECIFICATION forming part of Letters Patent No. 731,531, dated June 23, 1903.

Application filed June 25, 1902. Serial No. 113,092. (No model.)

*To all whom it may concern:*

Be it known that I, CHARLES H. ASLING, a citizen of the United States, residing at Springfield, in the county of Greene and State of Missouri, have invented certain new and useful Improvements in a Combined Water-Heater, Food-Warmer, and Drying-Rack, of which the following is a specification.

My invention relates to an improved combined water-heater, food-warmer, and drying-rack; and one object of my invention is the provision of a device which can be applied directly to the stovepipe to utilize the waste heat for heating the water and also warming an oven to contain food and, further, to provide means for drying articles.

Another object of my invention is the provision of a combined water-heater, food-warmer, and drying-rack which will be of compact size and not be in the way, which can be applied at a small expense and itself be the embodiment of simplicity, inexpensiveness, and which will perform its functions in an efficient and practical manner.

With these objects in view my invention consists of a device of the character and for the purpose stated embodying novel features of construction and combination of parts, substantially as disclosed herein.

Figure 1 represents a perspective view of my complete invention applied to a stovepipe, showing particularly its application. Fig. 2 represents a vertical central sectional view through the device, and Fig. 3 represents a front view with the door of the oven open.

Referring by letter to the drawings, the letter A designates the stovepipe or flue provided with a damper B, and upon the pipe fits my combined water-heater, food-warmer, and drying-rack which utilizes the waste products of combustion to heat the water, warm the food, and dry the articles upon the rack.

My device comprises the oven C, which has an opening D for the passage of the flue and which oven has the top portion provided with an extension or flange E, formed with openings F, in which fit the hooked ends G of the drying-arms H, and this forms a perfect drier for small articles, and when the device is not needed the arms can be dropped down in the openings to a vertical position, where they will be out of the way.

The oven or food-warmer is further provided with a shelf J and with a central strip K and is provided with a door L, which is hinged at M to its lower edge and is provided with a combined sliding latch and handle N, the latch being retained by the keeper O and held in place by the guides P, secured to the door, and from this construction it will be seen that I provide an oven which will receive the dishes containing the food and keep the food warm, and the single door will fall down and rest upon the water-tank Q and form a perfect shelf to place the dishes or other articles upon.

Below the oven is the water receptacle or tank Q, which is of tapering or conical form and is provided with a lid or hinged cover R, which allows the filling of the tank, and is provided at its lower portion with a draw-off cock or spigot S, and from this construction it is evident that the water is properly heated by the stovepipe, the tank can be easily filled, and a constant supply of hot water can be kept on hand.

I use the frame T for supporting the tank upon the stove and serving to steady and secure the entire device in place.

It will be understood that my device fits around the stovepipe and that the closed tank or reservoir holds water, the water being heated by the waste hot air, also the oven being heated by the hot air and the drying being accomplished by the heat from the oven; also, the heat from the water in the reservoir being of a warm character, coming from the heated water, serves to supply a warm air to the oven to keep the food in warm condition.

It is evident from the foregoing that I provide an inexpensive and practical device which can be easily applied to the flue or stove and which will occupy but a small amount of space and which will effectively heat the water, warm food, or dry articles with the waste heat and which will thus prove a useful and desirable device.

I claim—

In combination with a stovepipe, a water-receptacle surrounding the pipe and having an offset cover portion and a discharge-cock, an oven above the water-receptacle also surrounding the pipe, a door for said oven, the offset cover portion of the water-receptacle being adapted to support said door when open, the top of the oven being extended to receive arms to serve as a clothes-drier.

In testimony whereof I affix my signature in presence of two witnesses.

CHARLES H. ASLING.

Witnesses:
 DAVID MAYES,
 R. G. PORTER.